US008423668B2

(12) United States Patent
Yadav et al.

(10) Patent No.: US 8,423,668 B2
(45) Date of Patent: Apr. 16, 2013

(54) LINK STATE PROTOCOL ROUTING MESSAGE CONTAINMENT

(75) Inventors: Navindra Yadav, San Jose, CA (US); Suresh Katukam, San Jose, CA (US); Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 11/967,931

(22) Filed: Dec. 31, 2007

(65) Prior Publication Data

US 2009/0172190 A1 Jul. 2, 2009

(51) Int. Cl.
*G06F 15/173* (2006.01)
(52) U.S. Cl.
USPC .......................................... 709/244
(58) Field of Classification Search .................. 709/244, 709/24
See application file for complete search history.

(56) References Cited

U.S. PATENT DOCUMENTS

| 7,031,288 | B2 * | 4/2006 | Ogier .......................... 370/338 |
| 7,957,377 | B1 * | 6/2011 | Roy .............................. 370/392 |
| 2001/0033574 | A1 * | 10/2001 | Enoki et al. .................. 370/396 |
| 2002/0062388 | A1 * | 5/2002 | Ogier et al. .................. 709/238 |
| 2004/0042473 | A1 * | 3/2004 | Park et al. ..................... 370/408 |
| 2005/0111349 | A1 * | 5/2005 | Vasseur et al. ............... 370/216 |
| 2006/0072461 | A1 * | 4/2006 | Luong et al. ................. 370/236 |
| 2007/0058568 | A1 * | 3/2007 | Previdi et al. ................ 370/254 |

* cited by examiner

*Primary Examiner* — Ashok Patel
*Assistant Examiner* — Lawrence Cosby
(74) *Attorney, Agent, or Firm* — Schwegman, Lundberg & Woessner, P.A.

(57) ABSTRACT

In one example embodiment, a system and method are shown that includes calculating a first SPF tree for a first device, the first SPF tree including a root node and a first child node, the first device being the root node of the first SPF tree. Additionally, the system and method may include calculating a second SPF tree for a second device that is a neighbor of the first device, the second SPF tree including a root node and a first child node, the second device being the root node of the second SPF tree. Further, the system and method may include building a set of interested nodes including the second device, if the first child node if the first SPF tree and the first child node of the second SPF tree are distinct.

18 Claims, 11 Drawing Sheets

LINK STATE PROTOCOL ROUTING MESSAGE CONTAINMENT

FIELD

This application relates to a system and method for updating network devices.

BACKGROUND

Link-state routing protocols allow for the communication of network topologies between devices existing within a network. These link-state protocols may include the Open Shortest Path First (OSPF) protocol, and the Intermediate System to Intermediate System (IS-IS) protocol. Devices that utilize these protocols may include an Area Border Router (ABR), in the case of OSPF, or L1, L2, L1-2 routers in the case of IS-IS. Additional devices that may be part of the network may include a Provider Edge (PE), Customer Edge (CE), or a wireless router or access point (collectively wireless routers). These devices may be nodes in a topology. These wireless routers may use the 802.11b-y protocols (e.g., a Wi-Fi connection) in addition to the previously referenced OSPF or IS-IS protocols. These wireless routers may, for example, be used to connect to host devices such as personal computers, 802.11 capable cell phones, Personal Digital Assistants (PDAs), and smart phones to a network. A network may include one or more areas or Autonomous System (AS). Devices utilizing OPSF may use Link State Advertisements (LSAs) to communicate routing updates, whereas devices using IS-IS may use Protocol Data Units (PDUs) to communicate routing updates.

BRIEF DESCRIPTION OF DRAWINGS

The presently shown system and method are illustrated by way of example and not limitation in the figures of the accompanying drawings, in which like references indicate similar elements and in which.

DESCRIPTION OF EXAMPLE EMBODIMENTS

Figure 1:
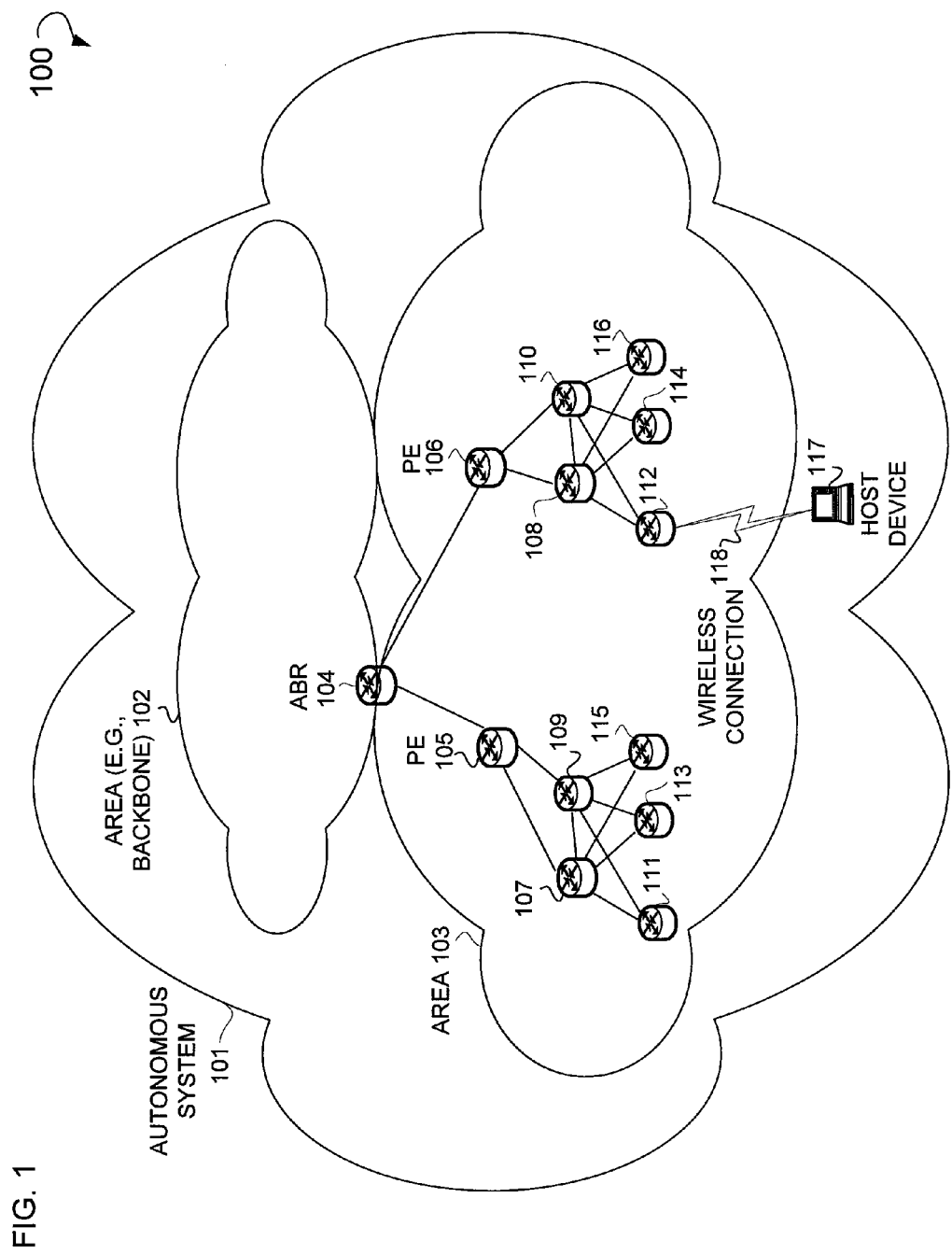
FIG. 1 is a diagram of a system, according to an example embodiment, implementing an OSPF-type architecture.

In the following description, for purposes of explanation, numerous specific details are set forth in order to provide a thorough understanding of an embodiment of the present invention. It may be evident, however, to one skilled in the art that the present invention may be practiced without these specific details.

Overview

In one example embodiment, a system and method are shown that include calculating a first SPF tree for a first device, the first SPF tree including a root node and a first child node, the first device being the root node of the first SPF tree. Additionally, the system and method may include calculating a second SPF tree for a second device that is a neighbor of the first device, the second SPF tree including a root node and a first child node, the second device being the root node of the second SPF tree. Further, the system and method may include building a set of interested nodes including the second device, if the first child node of the first SPF tree and the first child node of the second SPF tree are distinct.

DESCRIPTION OF EXAMPLE EMBODIMENTS

The range of the enterprise networks over which wireless clients (e.g., host devices) can roam may be spread out over a large geographical area with many switches and routers. An Internet Protocol (IP) address assigned to a host device provides two pieces of information: identity of the host device and the location of the host device. A host device that has active sessions while roaming would see a change of location (e.g., the point of attachment to the network infrastructure would change). However, the host device identity may not change as the session the host device is using in the network may still be active. In some example embodiments, the host device has IP address portability within an entire network which enables host devices to roam anywhere in the network. This allows network traffic to be routed natively to a host device.

In some example embodiments, a system and method are shown that allow for the pre-configuring of network devices that are to receive routing updates in a network that uses a link-state routing protocol. The pre-configuring of network devices may be facilitated through the execution of a link state protocol routing message algorithm (e.g., the algorithm referenced herein). The algorithm may be implemented in cases where a forwarder device such as a wireless router is provided a routing update (e.g., a LSA Type 5, LSA Type 7, or LSA Type 10), where the devices that make up the distribution layer to which the forwarder is connected change. These updates may be route addition updates, whereas in other cases these updates may be route deletion updates. A route addition update may update devices at the distribution and core layers as to the addition of a host device to the network. A route deletion update may update devices at the distribution and core layers as to the removal of a device from the network. As is more fully discussed below, an algorithm may be executed to pre-configure these network devices.

Some example embodiments may include, a network having a built-in hierarchy, and this hierarchy may include: an access layer, a distribution layer and a core layer. For example, a network deployed in a school campus setting may include an access layer of wireless routers (collectively referenced as forwarders or forwarding devices). In such a network, the wireless routers are operably connected to a switch. Each switch, in turn, is operably connected to two or more distribution switches residing as part of a distribution layer. The distribution switches, in turn, may operably connect to a campus backbone or core switches as part of a core layer. This core layer may contain device such as ABRs. Operably connected as used herein may denote a logical or physical connection. In some example embodiments, a forwarder, router, and/or ABR may be considered a device.

This hierarchy may form a building block of the network. In some example embodiments, a system and method are shown that exploits this hierarchy for scaling to large networks and for fast convergence. This system and method exploit the fact that not all network devices care about all events as conveyed by, for example, an LSA. For example, certain host moves need not be known to all devices in the network. In one example embodiment, instead of using standard OSPF update mechanism, the system and method shown herein pre-determine a set of interested nodes (e.g., a set of interested neighboring devices). Each member of the set of interested nodes are interested in receiving routing updates in regarding, for example, new host-forwarder association announcements. In some example embodiments, this set of interested devices may contain one or more identifiers for devices. These identifiers may be unique numeric identifiers such as Internet Protocol (IP) address, Media Access Control (MAC) addresses, or some other suitable unique numeric identifier. One type of update that may be addressed using the system and method shown herein is host-forwarder association announcements.

In some example embodiments, host-forwarder association announcements illustrate a change in the forwarder servicing a host device. For example, where a host device such as a PDA moves from one room in a building to another, there may be a corresponding change in the forwarder device that services this host device. The system and method shown herein describe an algorithm that may be used to pre-determine which network devices at the access layer, distribution layer, or a core layer need to be informed of this movement of the host device.

In some example embodiments, the algorithm is implemented such that the existing link-state routing protocol behavior is modified so that the information about the external routes or hosts attached to the devices, which is used to build the forwarding tables to forward traffic to the host/external routes, is optimized and filtered. This filtering (e.g., referenced above as pre-determining) is achieved by every device in a network running a shortest path algorithm for each of its neighbors, with the neighbor as the root of a SPF routing tree. A shortest path (e.g., a tree) may be a path with the least amount of hops between a source node, such as a router, and a sink node such as an ABR. Further, a shortest path (e.g., a tree) may be a path with the least amount of distance per link between hops between a source node such as a router, and a sink node such as an ABR. A neighbor may be a device that can be reached by the device running the shortest path algorithm without accessing another device first (e.g., a neighbor is one hop away from the device running the shortest path algorithm). A hop may be one physical or logical link between two devices. The device may then compute the set of interested neighboring devices (e.g., a set of interested nodes) to which the device should propagate an update. Propagate or propagating may refer to transmitting an update from one device, such as a router, to another device. An update may be an LSA describing a new host-forwarder association. Forwarders may be routers which are leaf routers, wherein end hosts (e.g., hosts devices) are connected directly to the forwarder such that there is no router between the host device and the forwarder. The set of interested nodes may be used such that whenever there is an update relating to external routes/hosts attached to a router (e.g., a new host-forwarder association), the device may only send that update the pre-determined set of interested nodes. In some examples, when there is a topology change in the area (e.g., a host moves to be serviced by a different forwarder), a new set of interested nodes for every other neighbor may need to be determined. This new set of interested nodes may then be re-pushed to the neighbors. As alluded to above, Dijkstra's Algorithm, Breath First Traversal, or parallel Dijkstra may, for example, be used to compute the shortest path.

In one example embodiment, the algorithm may be used to compute the list of routers that participate in a non-backbone area that would be interested in hearing a host-forwarder association announcement. These routers may be interested in joining the source specific multicast group of the forwarder. An announcement may be a host-forwarder association announcement from the forwarder under consideration. The host-forwarder announcement may denote a change in a link state area for a host device. Further, this host-forwarder announcement may be generated in examples where a new forwarder or ABR joins, or leaves an area.

In one example embodiment, the algorithm may facilitate every router in an area performing the following computations to determine if the router is interested in what a specific forwarder has to announce. As executed, if the algorithm determines the router is an ABR, then the router can conclude that the router is interested in the host-forwarder association announcements and the algorithm terminates. If the router is not an ABR then, then the algorithm computes the shortest path from the router to all the other routers (e.g., ABRs, routers, and forwarders). This produces a directed SPF tree from the network area graph, with the router at the root of the tree to every other router in the area. Then, a traversal of all the paths from the router to each ABR and the forwarder under consideration is performed. In some examples, there may be multiple non looping directed paths in the directed SPF tree because of equal or unequal cost paths. With each traversal towards an ABR, a record is made of the first router (e.g., a first hop or first child node/router) traversed down the path leading from the root router to the ABR. A set is then created that contains this first hop. This set may be called a:

set_of_first_hop_routers_from_root_router_to_ABRs.

In some example embodiments, a further traversal may be performed towards the forwarder under consideration, and a record made of the first router (e.g., a first hop or first child node/router) traversed down the path leading from the root router to the forwarder under consideration. A set is then created that contains this first hop. This set may be called a: set_of_first_hop_routers_from_ root_router_to_forwarder_under_consideration.

In some example embodiments, a comparison may be performed to determine if the two sets are equivalent such that:

set_of_first_hop_routers_from_root_router_to_ABRs

=set_of_first_hop_routers_from_ root_router_to_forwarder_under_consideration.

If the two sets are equivalent, then the router executing the algorithm can safely conclude that it is not interested in the host-forwarder association announcements from the forwarder under consideration. However, if the two sets are not equivalent, then the router can conclude it is interested in the host-forwarder association announcements being broadcast from its neighbor. This router may then be made a member of the set of interested nodes.

Some example embodiments may include, restating the algorithm as: taking the union of the set of adjacencies for each of the ABRs along with their weights, and taking the union of the set of adjacencies for the forwarder under consideration. If the two sets are equal then the router is not interested in the forwarder, otherwise the router is interested in the forwarder.

In some example embodiments, this algorithm may be run in the backbone or core area of a network. Where the algorithm is run in a core area, an adjustment is made such that forwarders are substituted with the backbone ABRs (e.g., those ABRs connected to the wireless subnets), and substitute the ABRs in the algorithm with the wireless-subnet-defaultless routers.

FIG. 1 is a diagram of an example system 100, implementing an OSPF-type architecture. Shown is a system 100 including an Autonomous System (AS) 101. Included within this AS 101 is an area 102, and an area 103. With regard to area 102, area 102 forms a backbone or core area of the AS 101. Connecting the area 102 and area 103 is an ABR 104. Operably connected to the ABR 104 is a PE 106. Operably connected to the PE 106 is a router 108 and a router 110. Operably connected to the router 108 is a forwarder 112, a forwarder 114, and a forwarder 116. Operably connected to the router 110 is the forwarder 112, the forwarder 114 and the forwarder 116. Additionally, the router 108 is operably connected to the router 110.

Further, operably connected to the ABR 104 is a PE 105. Operably connected to the PE 105 is a router 107 and router 109. Operably connected to the router 107 is a forwarder 111, a forwarder 113, and a forwarder 115. Additionally, operably connected to the router 109 is the forwarder 11, the forwarder 113, and the forwarder 115.

Further, the router 107 is operably connected to the router 109. These various PEs 105 and 106, routers 107, 108, 109, 110, and forwarders 111, 112, 113, 114, 115 and 116, are all included within the area 103. Operably connected to the forwarder 112 is a host device 117. This host device 117 may be, for example, a personal computer with a wireless connection 118. This wireless connection 118 may be a Wi-Fi connection, or some other suitable wireless connection.

Figure 2:
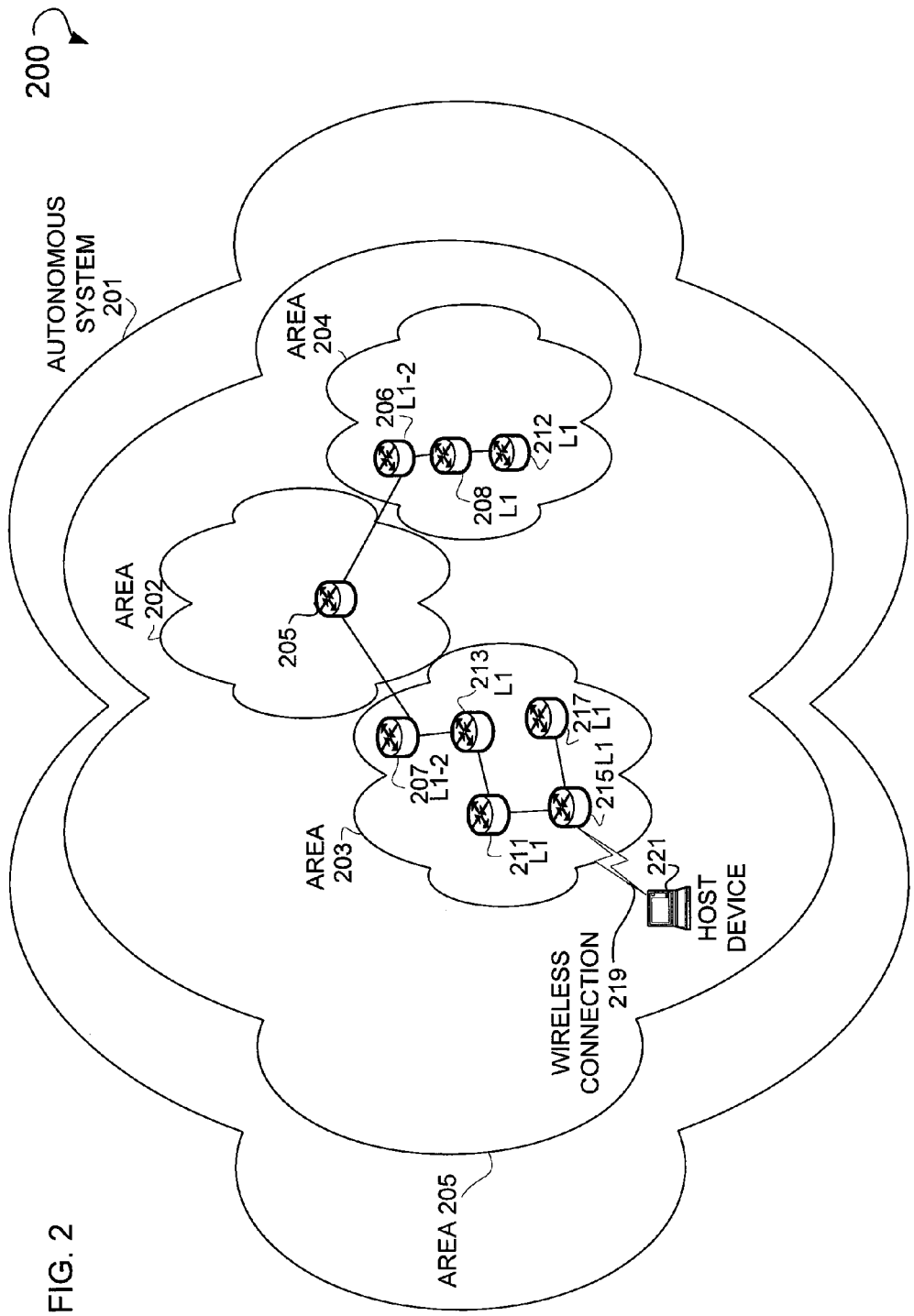
FIG. 2 is a diagram of a system, according to an example embodiment, illustrating an IS-IS architecture.

FIG. 2 is a diagram of an example system 200, illustrating an IS-IS architecture. Shown is an AS 201. Included within this AS 201 is an area 205. This area 205 further contains an area 202, an area 203, and an area 204. Included within area 202 is a router 205. Operably connected to this router 205 is a level 1-2 router 206, and operably connected to this level 1-2 router 206 is a level 1 router 208. Further, operably connected to this level 1 router 208 is a level 1 router 212. These various routers 206, 208, and 212 reside within the area 204.

Additionally, in some example embodiments, a level 1-2 router 207 is operably connected to the router 205. Operably connected to the level 1-2 router 207 is a level 1 router 213. Further, operably connected to this level 1 router 213 is a level 1 router 211. Operably connected to the level 1 router 211 is a level 1 router 215. Additionally, operably connected to the level 1 router 215 is a level 1 router 217. Connected to the level 1 router 215 is a host device 221. This host device 221 is operably connected to the level 1 router 215 via a wireless connection 219. This wireless connection 219 may be a Wi-Fi connection provided by devices including a Wireless Access Point (WAP), Wireless router, or other suitable wireless networking device. These various routers 207, 213, 211, 215, and 217 may reside within the area 203. While the present system and method are illustrated using an OSPF architecture, the present system and method are equally applicable in an IS-IS architecture, and may be implemented in such an IS-IS architecture.

Figure 3:
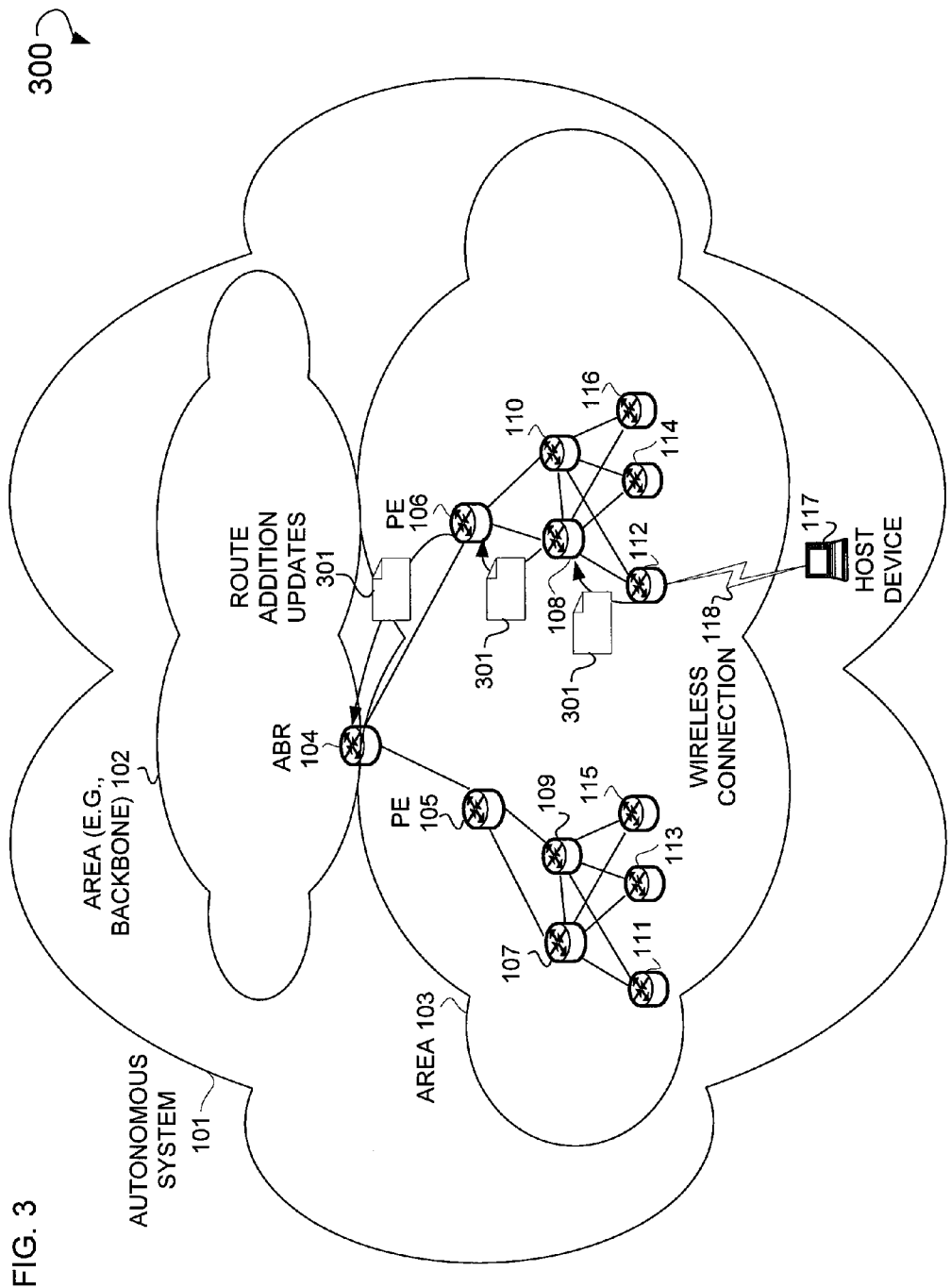
FIG. 3 is a diagram of a system, according to an example embodiment, illustrating an OSPF architecture including various route addition updates.

FIG. 3 is a diagram of an example system 300, illustrating an OSPF architecture including various route addition updates. Shown is the previously illustrated host device 117, operably connected to the forwarder 112 via the wireless connection 118. In some example embodiments, where the host device 117 actually connects to the forwarder 112, a route addition update 301 is generated by the forwarder 112, and is propagated upwards from the access layer where the forwarder 112 resides to the distribution layer where the router 108 resides. This router 108 may, in turn, propagate the route addition update 301 up to a PE 106, which may then, in turn, propagate this route addition update 301 to the ABR 104. This ABR 104 may reside as a part of a core layer of the network.

In some example embodiments, a route addition update may serve to notify various devices within the layers of the OSPF network as to the location of the host device 117, and which forwarder is servicing the host device 117. This route addition update 301 may be transmitted using a Type 5 LSA, a Type 7 LSA, or a Type 10 LSA, and may contain information relating to a host-forwarder association. In this example, the host is the host device 117, and the forwarder is the forwarder 112.

Figure 4:
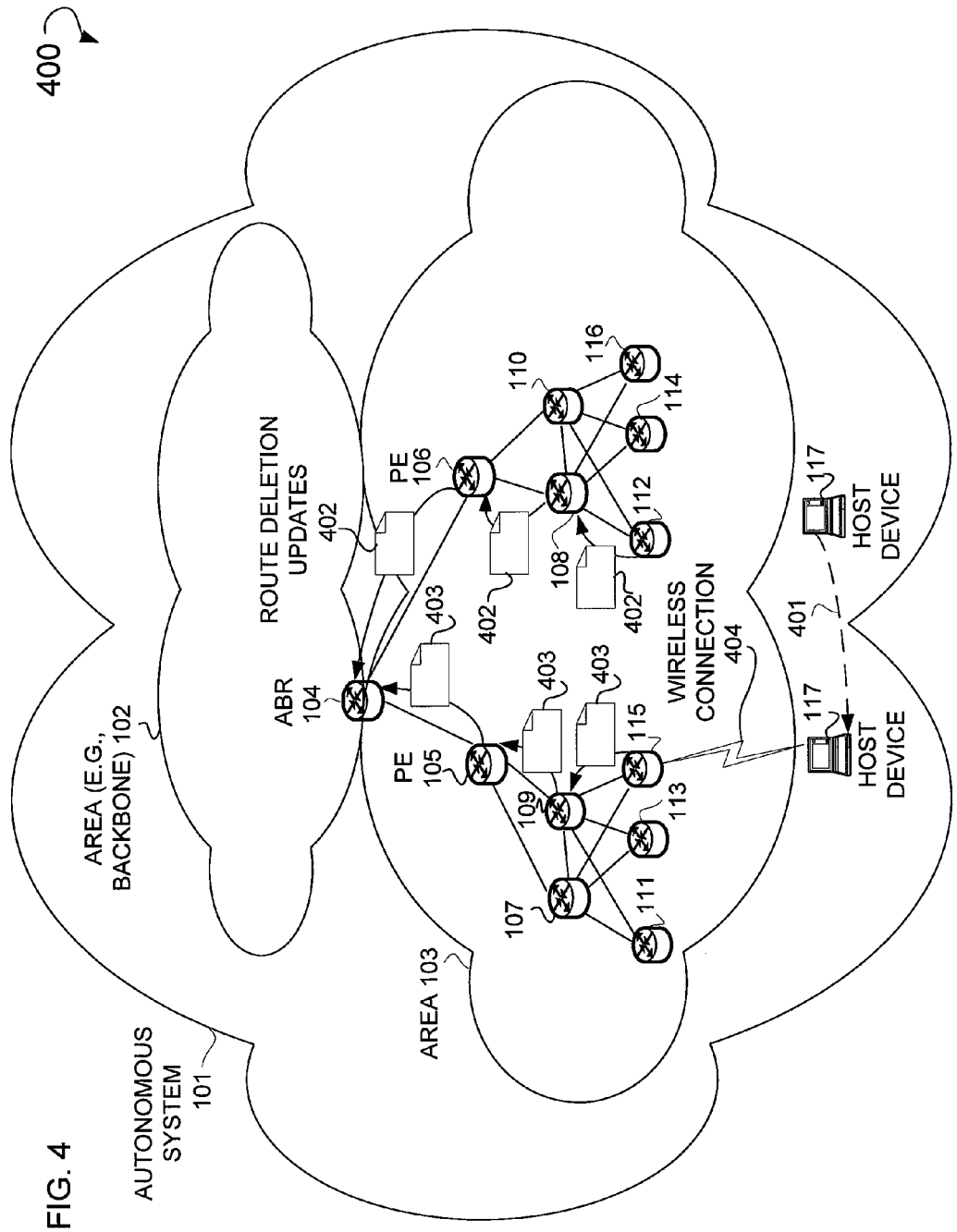
FIG. 4 is a diagram of a system, according to an example embodiment, illustrating an OSPF architecture where route addition and route deletions updates are utilized.

FIG. 4 is a diagram of an example system 400, illustrating an OSPF architecture where route deletions updates are utilized. Shown is a host device 117 that changes positions, such that the host device 117 is no longer serviced by the forwarder 112, but is now serviced by the forwarder 115. This change in position is denoted at 401. Where a change in position occurs, a new host forwarder message may be generated by the forwarder that now services the host device 117. Here, for example, forwarder 115 may generate a route addition update 403 that may be propagated to the router 109 residing at the distribution layer. This route addition update 403 may then be propagated to the PE 105, which, in turn, further propagates the route addition update 403 to the ABR 104 that resides at the core layer.

Additionally, in some example embodiments, the forwarder 112 that previously serviced host device 117 may propagate a route deletion update 402 to the router 108. This router 108 may, in turn, propagate this route deletion update 402 to the PE 106. The PE 106, in turn, may propagate a route deletion update 402 to the ABR 104. This route deletion update 402 may be included in, for example, an LSA Type 5, a LSA Type 7, or an LSA Type 10.

Figure 5:
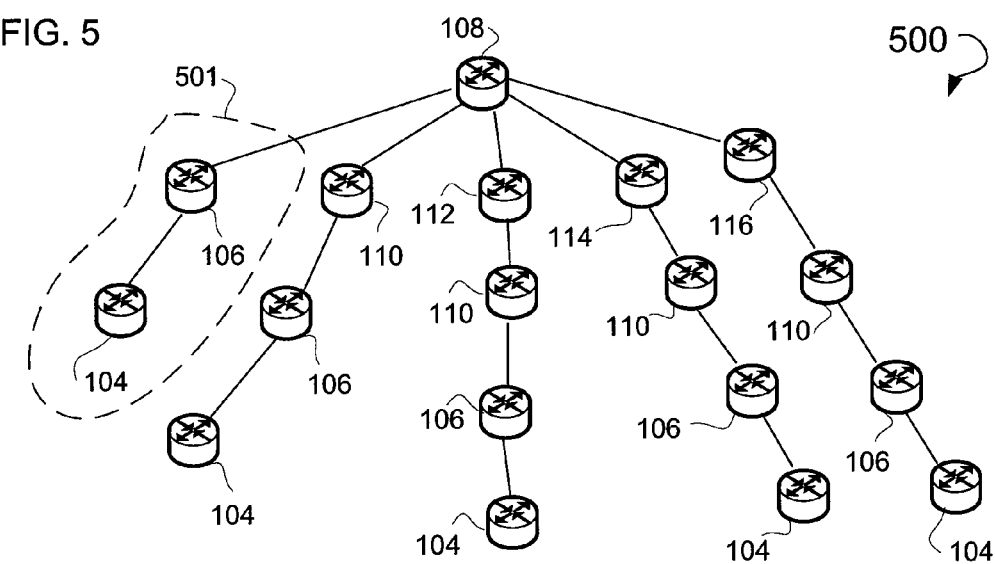
FIG. 5 is a diagram of a partial Shortest Path First (SPF) tree, according to an example embodiment, wherein the root of this SPF tree is a router.

FIG. 5 is a diagram of an example partial SPF tree 500, wherein the root of this SPF tree 500 is the router 108. In some example embodiments, some type of shortest path algorithm, such as Dijkstra's algorithm, is utilized to generate an SPF tree for a particular router. Here, for example, an SPF tree is generated, wherein the router 108 serves as the root of this tree. As illustrated, one path along this tree is the path from the router 108 to the PE 106, and from the PE 106 to the ABR 104. This path may be collectively referenced as a shortest path 501, and this path represents the shortest path from the router 108 to the ABR 104. Further, in router 108 is a root node in this shortest path 501, and the ABR 104 is a first child of the router 108. Additional paths are also illustrated as a part of this partial SPF tree 500. Shown, for example, is a path from the router 108 to the router 110 to the PE 106, and to the ABR 104. A further path is shown from the router 108 to the forwarder 112 to the router 110 to the PD 106, and to the ABR 104. Another path is shown from the router 108 to the forwarder 114 to the router 110 to the PE 106, and to the ABR 104. An additional path is shown from the router 108 to the forwarder 116 to the router 110 to the PE 106, and to the ABR 104. While these additional paths exist, for purposes of the system and method described herein, only the shortest path 501 need be known.

Figure 6:
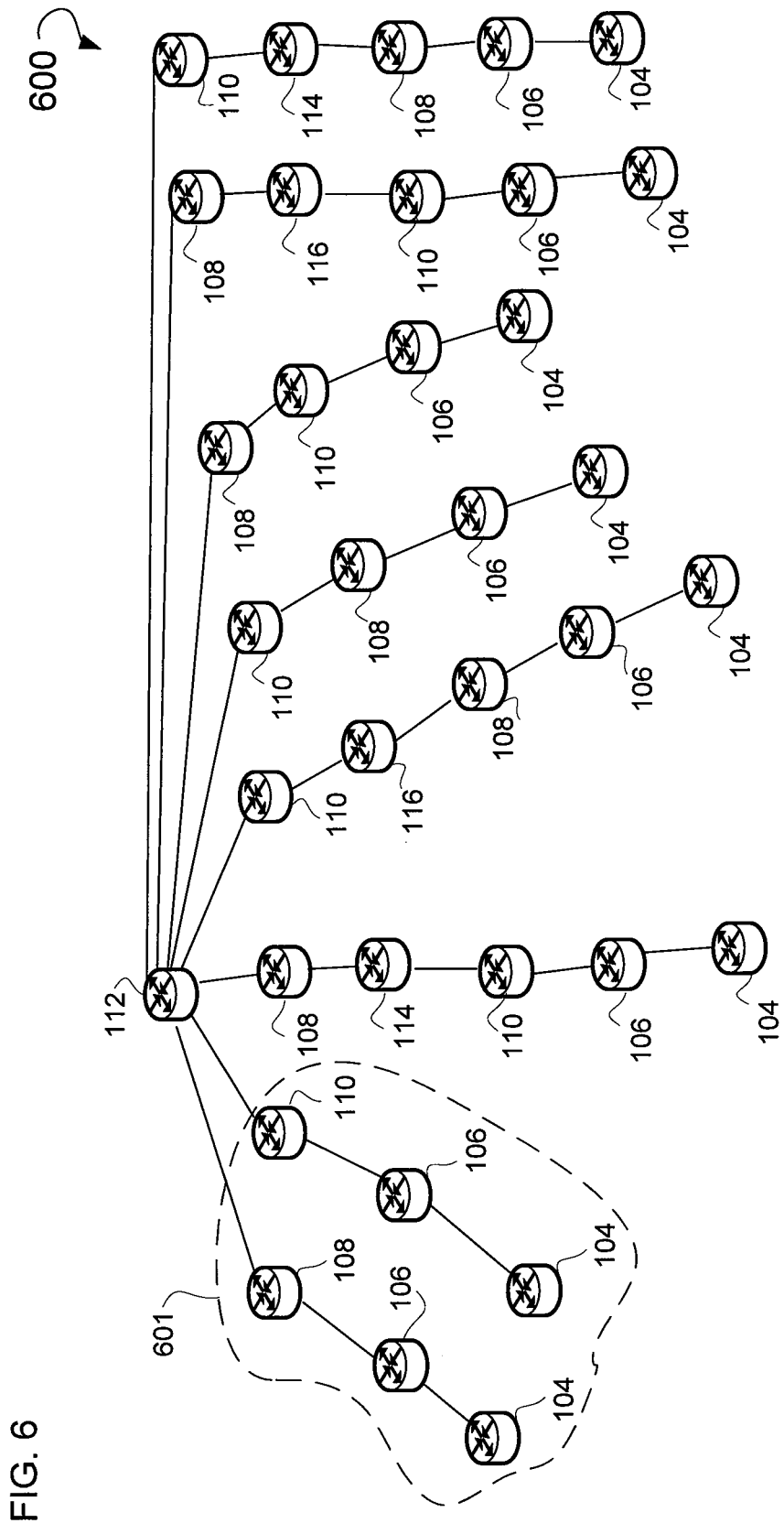
FIG. 6 is a diagram of a partial SPF tree, according to an example embodiment, for a neighbor of router.

FIG. 6 is a diagram of an example partial SPF tree 600 for a neighbor of router 108. Here, a partial SPF tree for the forwarder 112 is illustrated. The shortest paths for this forwarder 112 may be collectively illustrated as the shortest paths 601. The shortest paths 601 contain a path from the forwarder 112 to the router 108 to the PE 106, and to the ABR 104. A second equivalent path is also shown to be a part of the shortest paths 601. This equivalent path is the path from the forwarder 112 to the router 110 to the PE 106, and to the ABR 104. Further, router 108 is a root node in this shortest paths 601, and the PE 106 is a first child of the router 108. Additionally, router 110 is a root node in this shortest paths 601, and the PE 106 is a first child.

In some example embodiments, additional paths are also shown along this partial SPF tree 600. These additional paths include, for example, the path from the forwarder 112 to the router 108 to the forwarder 114 to the router 110 to the PE 106, and to the ABR 104. An additional path is shown from the forwarder 112 to the router 110 to the forwarder 116 to the router 108 to the PE 106, and to the ABR 104. Another path is shown from the forwarder 112 to the router 110 to the router 108 to the PE 106, and to the ABR 104. Further, a path is shown from the forwarder 112 to the router 108 to the router 110 to the PE 106, and to the ABR 104. Further, in some example embodiments, an additional path is shown from the forwarder 112 to the router 108 to the forwarder 116 to the router 110 to the PE 106, and to the ABR 104. Another path is shown from the forwarder 112 to the router 110 to the forwarder 114 to the router 108 to the PE 106, and to the ABR 104. While these additional paths exist, for purposes of the system and method described herein, only the shortest paths 601 need be known.

Figure 7:
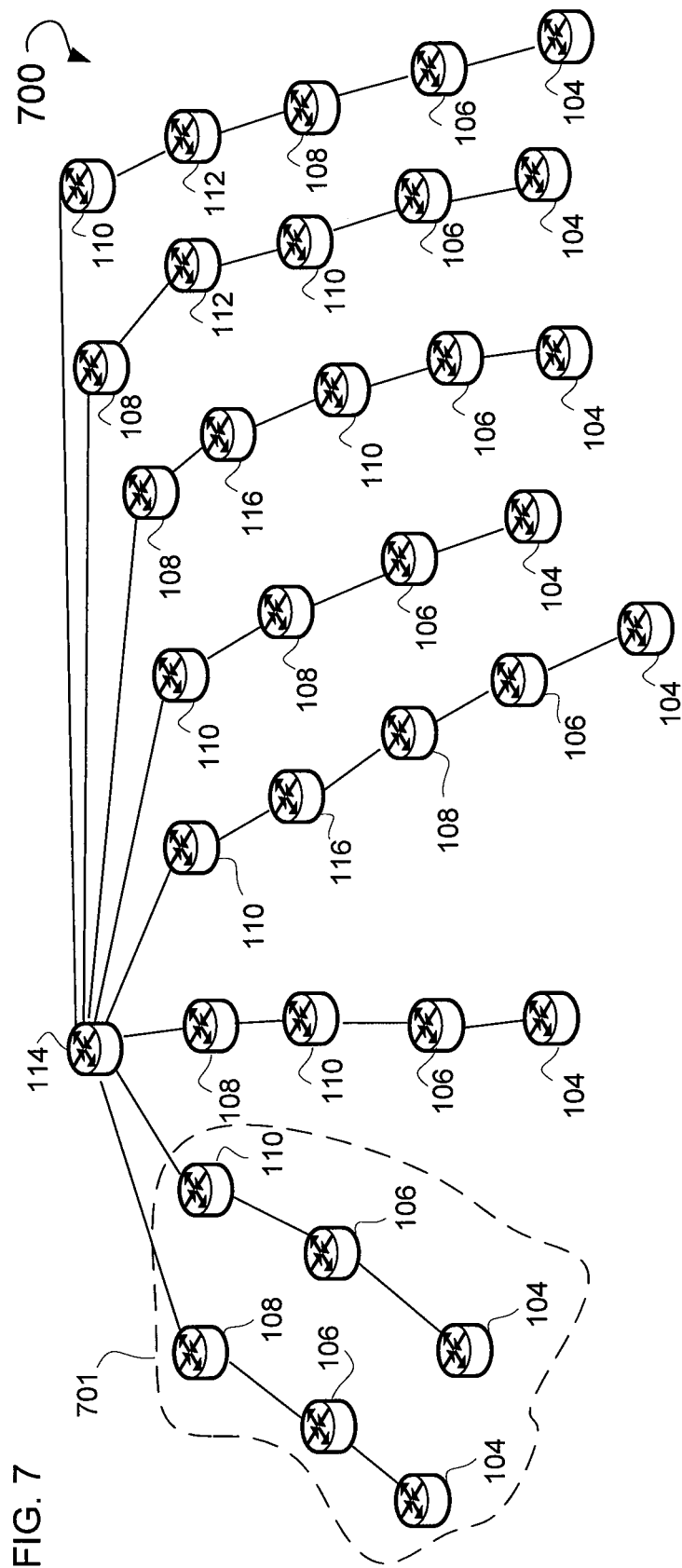
FIG. 7 is a diagram of a partial SPF tree, according to an example embodiment, for a neighbor of the router.

FIG. 7 is a diagram of an example partial SPF tree 700 for a neighbor of the router 108. Here, an SPF tree 700 is shown for the forwarder 114. Illustrated is a partial SPF tree for the forwarder 114. This partial SPF tree 700 contains a number of paths from the forwarder 114 to the ABR 104. Shown, for example, are two equivalent shortest paths 701. The shortest paths 701 includes a path from the forwarder 114 to the router 108, the PE 106, and to the ABR 104. An additional equivalent path is shown from the forwarder 114 to the router 110 to the PE 106, and to the ABR 104. The router 108 is a root node in this shortest paths 701, and the PE 106 is a first child of the router 108. Additionally, router 110 is a root node in this shortest paths 601, and the PE 106 is a first child. Additional paths are also shown. For example, a path from the forwarder 114 to the router 108 to the router 110 to the PE 106, and to the ABR 104. Another path from the forwarder 114 to the router 110 to the forwarder 116 to the router 108 to the PE 106, and to ABR 104. Additionally, a path from the forwarder 114 to the router 110 to the router 108 to the PE 106, and to the ABR 104 is shown. An additional path from the forwarder 114 to the router 108 to the forwarder 116 to the router 110 to the PE 106, and to the ABR 104 is shown. Further, a path is shown from the forwarder 114 to the router 108 to the forwarder 112 to the router 110 to the PE 106, and to the ABR 104 is shown. Moreover, a path is shown from the forwarder 114 to the router 110 to the forwarder 112 to the router 108 to the PE 106, and to the ABR 104. Additional paths may exist for an SPF tree with the forwarder 114 serving as the root of the SPF tree. For purposes of the system described herein, however, only the shortest path is reflected in the shortest paths 701 need be known.

Figure 8:
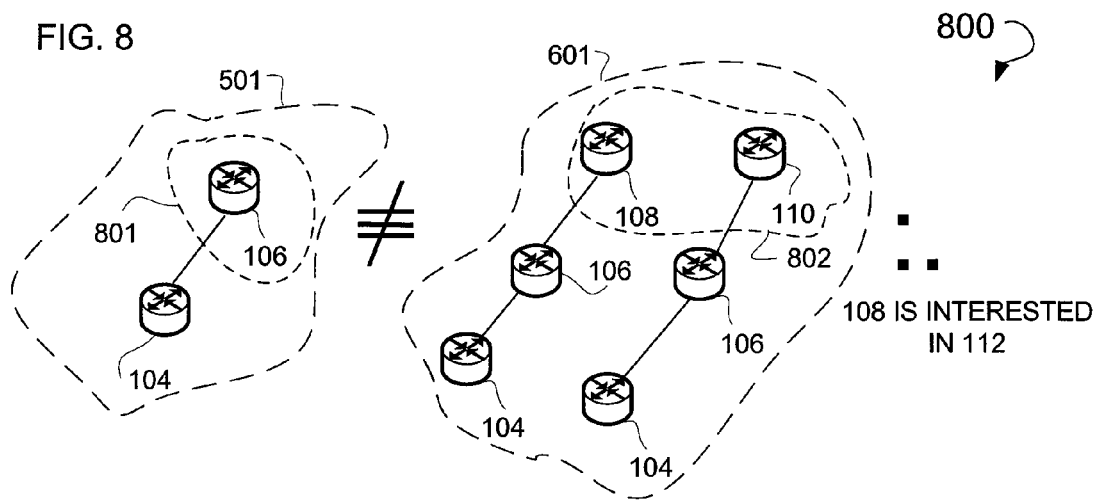
FIG. 8 is an equivalence diagram, according to an example embodiment, comparing the first hop sets for the shortest paths of various routers and forwarders.

FIG. 8 is an example equivalence diagram 800 comparing the first hop sets for the shortest paths of various routers and forwarders. In some example embodiments, the shortest paths 501 and 601 may be each be referred to as a SPF tree, where the path is composed of a root node, a child node and directed edges. Here, for example, the shortest path 501 for the router 108 is compared to the shortest paths 601 for the forwarder 112. A set 801 including the first hop in the shortest path 501 is compared to the set 802 including the first hops for the shortest paths for the forwarder 112. The set 801 and the set 802 are not equivalent. Where these sets are not equivalent, the forwarder 112 is interested in receiving updates from the router 108. In some example embodiments, the set 801 and set 802 may be understood to contain the first child nodes or routers of the shortest path 501 and the shortest path 601.

Figure 9:
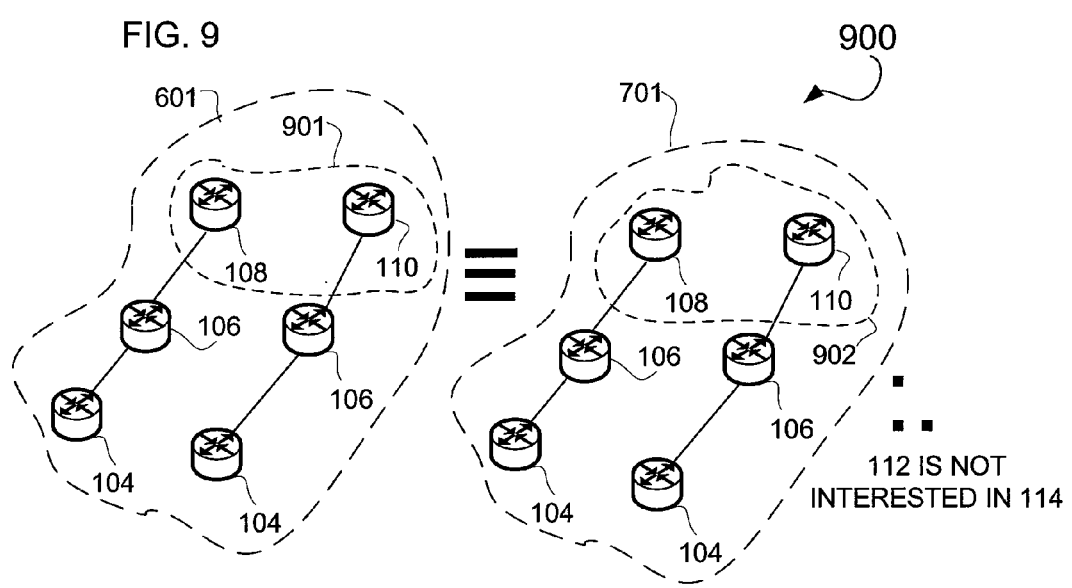
FIG. 9 is an equivalency diagram, according to an example embodiment, comparing the shortest paths for the forwarder to the shortest paths for another forwarder.

FIG. 9 is an equivalency diagram 900, comparing the shortest paths for the forwarder 112 to the shortest paths for the forwarder 114. In some example embodiments, the shortest paths 601 and 701 may be each be referred to as a SPF tree, where the path is composed of a root node, a child node and directed edges. Illustrated is the shortest path 601 for the forwarder 112 and the shortest paths 701 for the forwarder 114. A first hop set 901 for the shortest path 601 is compared to a first hop set 902 for the shortest path 701. Here, for example, the first hop sets 901 and set 902 are equivalent. Where the sets are equivalent, the forwarder 112 is not interested in receiving updates from the forwarder 114 such that, for example, the forwarder 112 will not receive updates relating to a new host-forwarder association from the forwarder 114. In some example embodiments, the set 801 and set 802 may be understood to contain the first child nodes or routers of the shortest path 601 and the shortest path 701.

Figure 10:
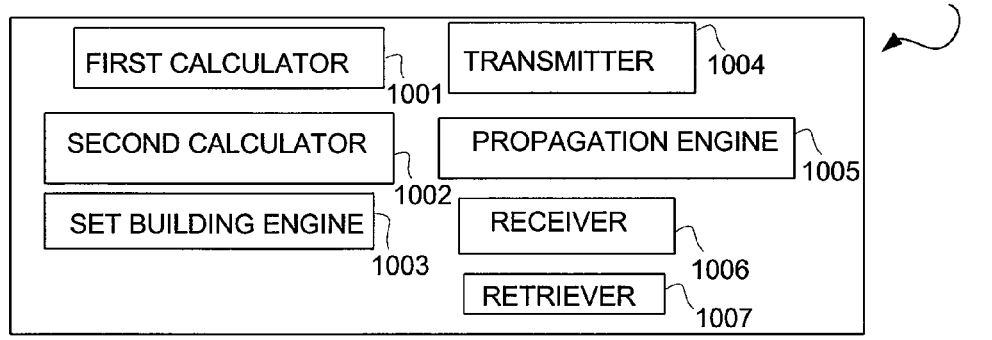
FIG. 10 is a block diagram of a computer system, according to an example embodiment, used to determine a member of set of interested nodes.

FIG. 10 is a block diagram of a computer system 1000 used to determine a member of set of interested nodes. These various blocks may reside as part of a router 108, forwarder 112, or some other suitable device. As referenced below, the first and second devices may be a router 108, forwarder 112, or some other suitable device. Additionally, these blocks may be implemented in hardware, firmware, or software. Further, these various blocks include: a first calculator 1001, a second calculator 1002, a set building engine 1003, a transmitter 1004, a propagation engine 1005, a receiver 1006, and a retriever 1007. Illustrated is a first calculator 1001 to calculate a first SPF tree for a first device, wherein the first SPF tree includes a root node and a first child node. In some example embodiments, the first device is the root node of the first SPF tree. A second calculator 1002 may be used to calculate a second SPF tree for a second device that is a neighbor of the first device, wherein the second SPF tree includes a root node and a first child node, the second device being the root node of the second SPF tree. A set building engine 1003 may be used to build a set of interested nodes that includes the second device if the first child node of the first SPF tree and the first child node of the second SPF tree are distinct. This building may include retrieving an identifier of an interested nodes from a forwarding table residing on a device. This identifier may be an IP address, Media Access Control (MAC) address, or some other suitable identifier. This identifier may then be stored into a further data store as a member of the set of interested nodes. A transmitter 1004 may be used to transmit a routing update to the second device, wherein the second device is a member of the set of interested nodes. A propagation engine 1005 may be used to propagate the routing update through a layer of a network, wherein the layer includes at least one of an access layer, a distribution layer or a core layer.

In some example embodiments, the routing update includes a route deletion update or a route addition update. A receiver 1006 may be used to receive a transmission from a host device. A retriever 1007 may be used to retrieve a member of the set of interested nodes, the member including the second device. In some example embodiments, the transmitter 1004 may be used to transmit a route addition update to the second device, the route addition update including routing information for the host device. In some example embodiments, the retriever 1007 may be used to retrieve a member of the set of interested nodes, the member including the identifier for the second device. Some example embodiments may include, using the transmitter 1004 to transmit a route deletion update to the second device if a transmission is no longer received from a host device. In some example embodiments, the neighbor is a device that is one hop away from the first device. Further, the first and second calculators may use Dijkstra's algorithm. Additionally, the second device may include at least one of a forwarder or a router.

Figure 11:
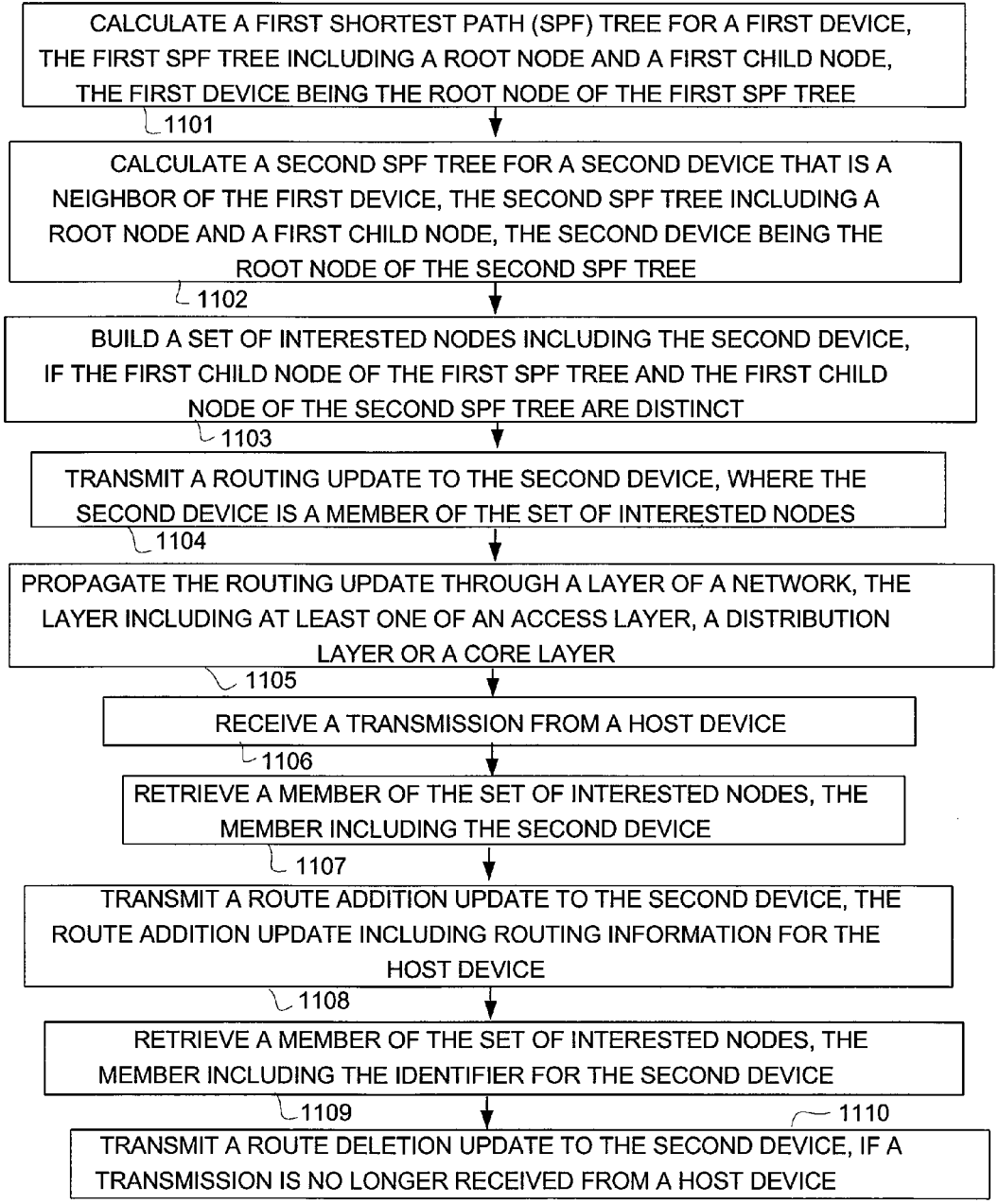
FIG. 11 is a flow chart illustrating a method, according to an example embodiment, to determine members of an interested set.

FIG. 11 is a flow chart illustrating an example method 1100 to determine members of an interested set. Illustrated are various operations 1101 through 1110. Shown is an operation 1101 that, when executed, calculates a first SPF tree for a first device. In some example embodiments, the first SPF tree includes a root node and a first child node, where the first device is the root node of the first SPF tree. An operation 1102 is also shown that, when executed, calculates a second SPF tree for a second device that is a neighbor of the first device, the second SPF tree including a root node and a first child node, the second device being the root node of the second SPF tree. Operation 1103, when executed, builds a set of interested nodes including the second device, if the first child node of the first SPF tree and the first child node of the second SPF tree are distinct. An operation 1104, when executed, transmits a routing update to the second device, where the second device is a member of the set of interested nodes. Operation 1105, when executed, propagates the routing update through a layer of a network, the layer including at least one of an access layer, a distribution layer or a core layer.

In some example embodiments, the routing update includes at least one of a route deletion update or a route addition update. Operation 1106, when executed, receives a transmission from a host device. Operation 1107, when executed, retrieves a member of the set of interested nodes, the member including the second device. Operation 1108, when executed, transmits a route addition update to the second device, the route addition update including routing information for the host device. Operation 1109, when executed, retrieves a member of the set of interested nodes, the member including the identifier for the second device. Operation 1110, when executed, transmits a route deletion update to the second device, if a transmission is no longer received from a host device. In some example embodiments, a neighbor is a device that is one hop away from the first device. Some example embodiments may include the calculations is performed based upon Dijkstra's algorithm. Additionally, the second device may include at least one of a forwarder or a router.

Figure 12:
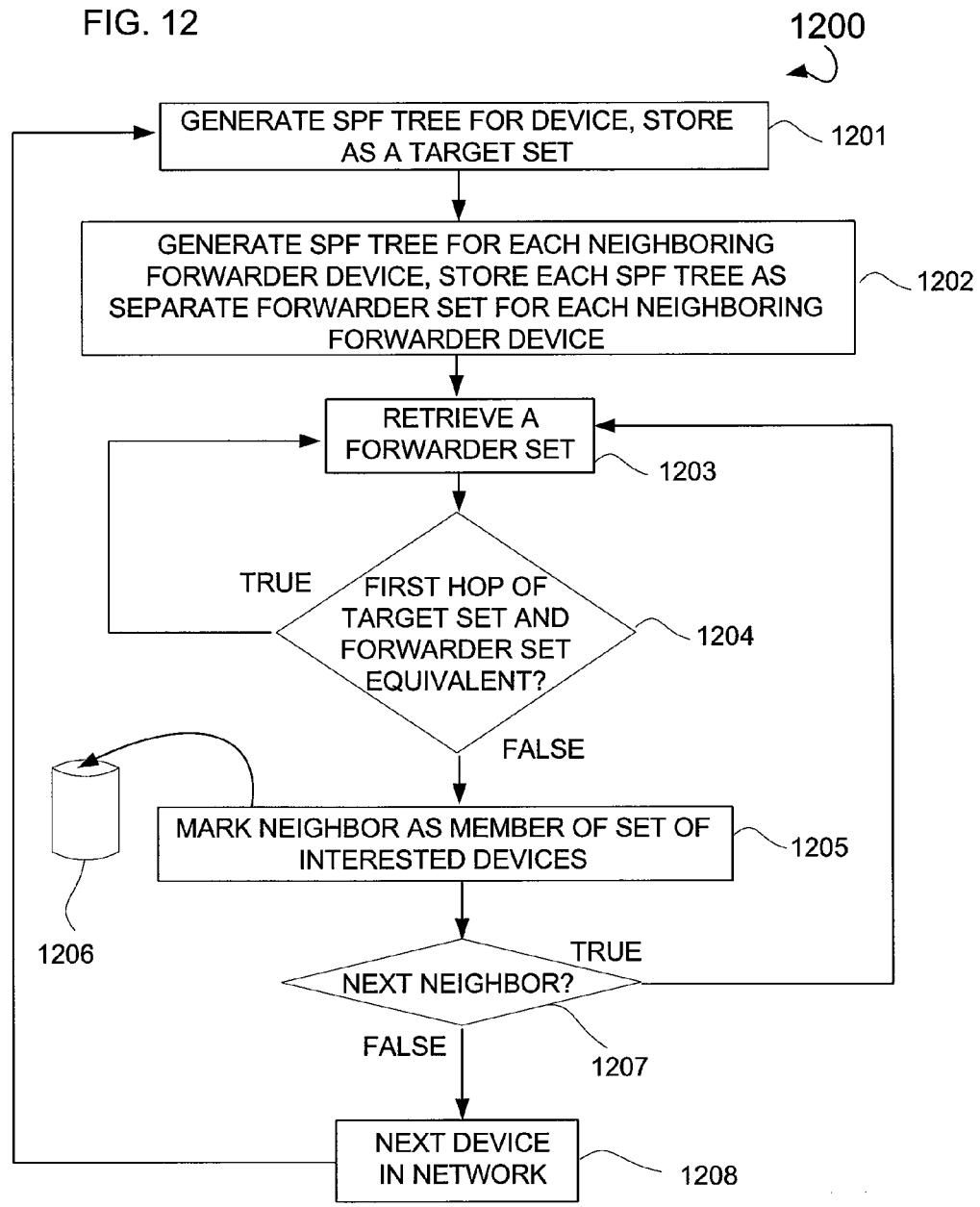
FIG. 12 is a flow chart illustrating a method, according to an example embodiment, used to determine whether or not a device is a member of a set of interested nodes (e.g., devices).

FIG. 12 is a flow chart illustrating an example method 1200 used to determine whether or not a device is a member of a set of interested devices. These devices may be a router, a forwarder, or some other suitable device. Illustrated are various operations 1201 through 1205, and operations 1207 though 1208 that residing upon, for example, the router 108. In some example embodiments, an operation 1201 is executed that generates an SPF tree for a device, and stores this SPF tree as a target set. An operation 1202 is executed that generates an SPF tree for each neighboring forwarder device and stores each of these SPF trees as a separate forwarder set. For example, the router 108 may generate an SPF tree for itself and all of its forwarder neighbors, such as, for example, the forwarders 112, 114, and 116. An operation 1203 may be executed that retrieves a forwarder set. Further, a decisional operation 1204 may be executed that determines whether the first hop of the target set and the first hop of the forwarder set are equivalent. In cases where decisional operation 1204 evaluates to "true," the operation 1203 is re-executed.

In cases where decisional operation 1204 evaluates to "false," an operation 1205 may be executed. Operation 1205 may be executed to mark a neighbor (e.g., a forwarder, such as forwarder 112, 114, or 116) as a member of an interested set. A decisional operation 1207 may be executed that determines whether additional neighbors of the device executing the method 1200 exist. In cases where decisional operation 1207 evaluates to "true," the operation 1203 may be re-executed. In cases where decisional operation 1207 evaluates to "false," an operation 1208 may be executed that determines the next device in the network for which the method 1200 may be executed. This operation 1208 may be executed in cases where the method 1200 is implemented by a network management application that is charged with pre-configuring a plurality of network devices. In cases where method 1200 is implemented on, for example, the router 108 the operation 1208 may be replaced with a termination condition.

In some example embodiments, the method 1200 may be implemented to predetermine an interested set of routers. This interested set of routers may be based upon members of an area, such as area 103, area 203 or area 204. This predetermination may occur on the fly when, for example, a device becomes a member of an area, or may be configured when a network is brought on line or implemented as a whole.

Figure 13:
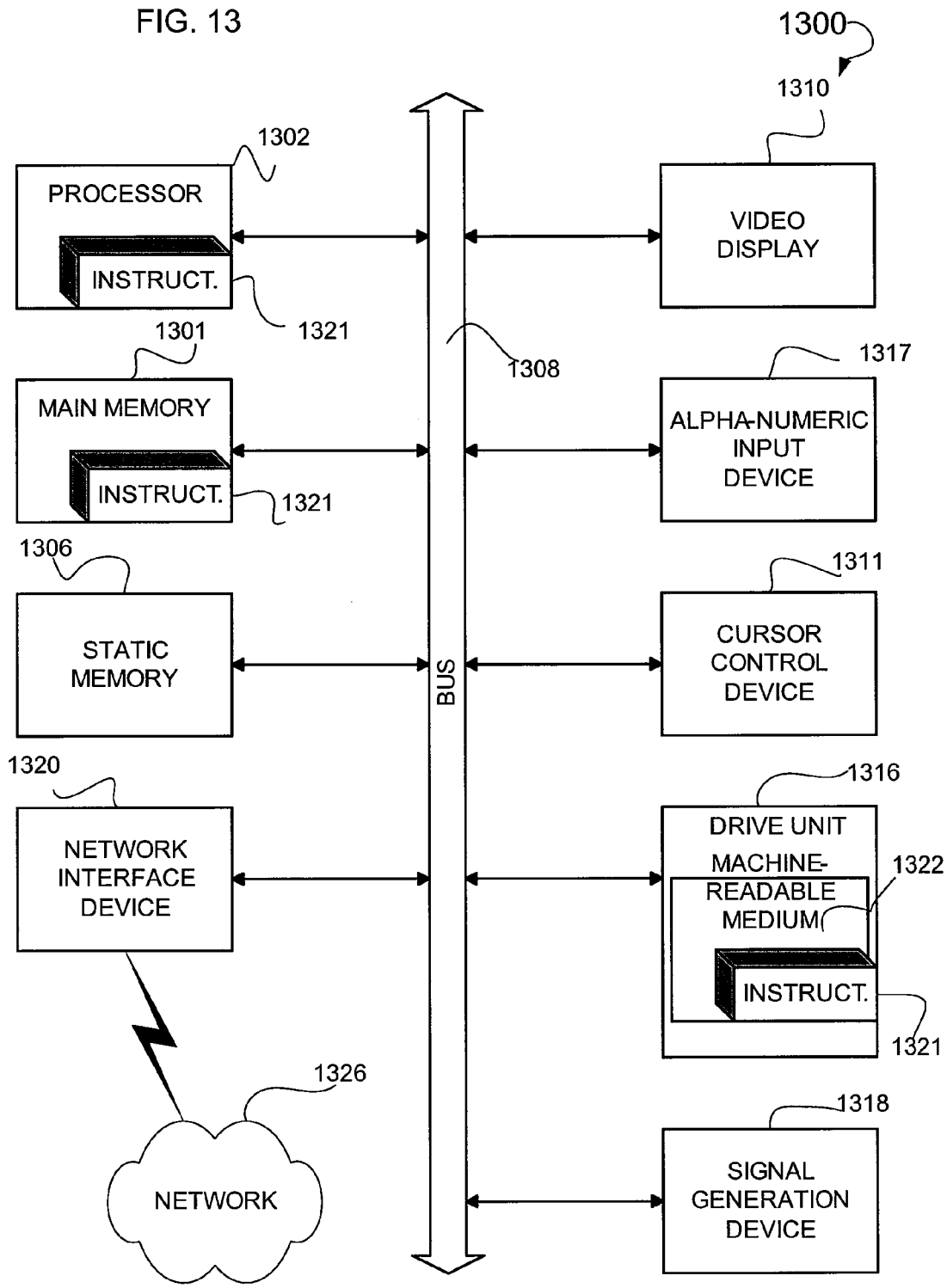
FIG. 13 shows a diagrammatic representation of machine in the example form of a computer system 1300 within which a set of instructions, for causing the machine to perform any one or more of the methodologies discussed herein, may be executed.

FIG. 13 shows a diagrammatic representation of machine in the example form of a computer system 1300 within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a Central Processing Unit (CPU), a Graphics Processing Unit (GPU) or both), a main memory 1301 and a static memory 1306, which communicate with each other via a bus 1308. The computer system 1300 may further include a video display unit 1310 (e.g., a LCD or a CRT). The computer system 1300 also includes an alphanumeric input device 1317 (e.g., a keyboard), a user interface (UI) cursor controller 1311 (e.g., a mouse), a disk drive unit 1316, a signal generation device 1314 (e.g., a speaker) and a network interface device (e.g., a transmitter) 1320.

The disk drive unit 1316 includes a machine-readable medium 1322 on which is stored one or more sets of instructions and data structures (e.g., software) 1321 embodying or utilized by any one or more of the methodologies or functions illustrated herein. The software may also reside, completely or at least partially, within the main memory 1301 and/or within the processor 1302 during execution thereof by the computer system 1300, the main memory 1301 and the processor 1302 also constituting machine-readable media.

The instructions 1321 may further be transmitted or received over a network 1326 via the network interface device 1320 using any one of a number of well-known transfer protocols (e.g., Hyper-Text Transfer Protocol (HTTP), Session Initiation Protocol (SIP)).

While the machine-readable medium 1322 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that cause the machine to perform any one or more of the methodologies of the present method and apparatus, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

In some example embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data that cause a general-purpose computer system or special-purpose computer system to perform a certain function or group of functions. The computer-executable or computer-readable instructions may be, for example, binaries, or intermediate format instructions such as assembly language, or even source code.

As shown herein, and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device where internal modules (e.g., a processor and memory) work together to perform operations on electronic data.

In some example embodiments, the method and apparatus may be practiced in network computing environments with many types of computer system configurations, including hubs, routers, wireless Access Points (APs), wireless stations, personal computers, laptop computers, multi-processor systems, microprocessor-based or programmable consumer electronics, network PCs, minicomputers, mainframe computers, and the like. The method and apparatus can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices (see below).

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   calculating a first shortest path first (SPF) tree for a first device, the first SPF tree including a root node and a first child node, the first device being the root node of the first SPF tree;
   calculating a second SPF tree for a second device that is a neighbor of the first device, the second SPF tree including a root node and a first child node, the second device being the root node of the second SPF tree;
   comparing the first SPF tree and the second SPF tree; and
   building a set of interested nodes excluding the second device if the first child node of the first SPF tree and the first child node of the second SPF tree are equivalent.

2. The method of claim 1, further comprising transmitting a routing update to all devices which are members of the set of interested nodes.

3. The method of claim 2, further comprising propagating the routing update through a layer of a network, the layer including at least one of an access layer, a distribution layer or a core layer.

4. The method of claim 2, wherein the routing update includes at least one of a route deletion update or a route addition update.

5. The method of claim 1, further comprising:
receiving a transmission from a host device;
retrieving a member of the set of interested nodes; and
transmitting a route addition update to the member of the set of interested nodes, the route addition update including routing information for the host device.

6. The method of claim 1, wherein the neighbor is a device that is one hop away from the first device.

7. The method of claim 1, wherein the calculating is performed based upon Dijkstra's algorithm.

8. The method of claim 1, wherein the second device includes at least one of forwarder or a router.

9. A computer system comprising:
a first calculator to calculate a first shortest path first (SPF) tree for a first device, wherein the first SPF tree includes a root node and a first child node, the first device being the root node of the first SPF tree;
a second calculator to calculate a second SPF tree for a second device that is a neighbor of the first device, wherein the second SPF tree includes a root node and a first child node, the second device being the root node of the second SPF tree; and
a set building engine to build a set of interested nodes based on a comparison between the first SPF tree and the second SPF tree, the set of interested nodes excluding if the first child node of the first SPF tree and the first child node of the second SPF tree are equivalent.

10. The computer system of claim 9, further comprising a transmitter to transmit a routing update to all devices which are members of the set of interested nodes.

11. The computer system of claim 10, further comprising a propagation engine to propagate the routing update through a layer of a network, wherein the layer includes at least one of an access layer, a distribution layer or a core layer.

12. The computer system of claim 10, wherein the routing update includes at least one of a route deletion update or a route addition update.

13. The computer system of claim 9, further comprising:
a receiver to receive a transmission from a host device;
a retriever to retrieve a member of the set of interested nodes; and
a transmitter to transmit a route addition update to the member of the set of interested nodes, the route addition update including routing information for the host device.

14. The computer system of claim 9, wherein a neighbor is a device that is one hop away from the first device.

15. The computer system of claim 9, wherein the first and second calculator use Dijkstra's algorithm.

16. The computer system of claim 9, wherein the second device includes at least one of a forwarder or a router.

17. An apparatus comprising:
a processor;
means for calculating a first shortest path first (SPF) tree for a first device, the first SPF tree including a root node and a first child node, the first device being the root node of the first SPF tree;
means for calculating a second SPF tree for a second device that is a neighbor of the first device~ the second SPF "tree including a root node and a first child node, the second device being the root node of the second SPF tree;
means for comparing the first SPF tree and the second SPF tree; and
means for building a set of interested nodes excluding the second device, where the first child node of the first SPF tree and the first child node of the second SPF tree are equivalent as determined by the processor.

18. Logic encoded in one or more non-transitory media for execution and when executed operable to:
calculate a shortest path first (SPF) tree for a first device, the first SPF tree including a root node and a first child node, the first device being the root node of the first SPF tree;
calculate a second SPF tree for a second device that is a neighbor of the first device, the second SPF tree including a root node and a first child node, the second device being the root node of the second SPF tree;
comparing the first SPF tree and the second SPF tree; and
build a set of interested nodes excluding the second device, if the first child node of the first SPF tree and the first child node of the second SPF tree are equivalent.

\* \* \* \* \*

UNITED STATES PATENT AND TRADEMARK OFFICE
CERTIFICATE OF CORRECTION

PATENT NO. : 8,423,668 B2  
APPLICATION NO. : 11/967931  
DATED : April 16, 2013  
INVENTOR(S) : Yadav et al.

Page 1 of 1

It is certified that error appears in the above-identified patent and that said Letters Patent is hereby corrected as shown below:

In the Claims

In column 14, line 21, in Claim 17, delete "device~" and insert --device,--, therefor In column 14, line 22, in Claim 17, delete ""tree" and insert --tree--, therefor Signed and Sealed this
Third Day of December, 2013

Margaret A. Focarino
*Commissioner for Patents of the United States Patent and Trademark Office*